(12) United States Patent
Elwell et al.

(10) Patent No.: US 7,848,315 B2
(45) Date of Patent: Dec. 7, 2010

(54) END-TO-END VOICE OVER IP STREAMS FOR TELEPHONE CALLS ESTABLISHED VIA LEGACY SWITCHING SYSTEMS

(75) Inventors: John Robert Elwell, Nottingham (GB); Duncan McNeillie, Nottingham (GB)

(73) Assignee: Siemens Enterprise Communications Limited, Bracknell (GB)

( * ) Notice: Subject to any disclaimer, the term of this patent is extended or adjusted under 35 U.S.C. 154(b) by 2044 days.

(21) Appl. No.: 10/415,521

(22) PCT Filed: Oct. 29, 2001

(86) PCT No.: PCT/GB01/04762

§ 371 (c)(1),
(2), (4) Date: Oct. 14, 2003

(87) PCT Pub. No.: WO02/37815

PCT Pub. Date: May 10, 2002

(65) Prior Publication Data

US 2004/0081176 A1    Apr. 29, 2004

(30) Foreign Application Priority Data

Oct. 30, 2000  (GB)  ................................. 0026482.0
Mar. 13, 2001  (GB)  ................................. 0106088.8

(51) Int. Cl.
 H04L 12/56  (2006.01)
(52) U.S. Cl. .................. 370/353; 370/355; 370/402
(58) Field of Classification Search ............ 370/401, 370/465, 351, 352, 524, 522, 389, 474, 394, 370/356, 410, 392, 312, 252, 256; 704/233
See application file for complete search history.

(56) References Cited

U.S. PATENT DOCUMENTS

| | | | |
|---|---|---|---|
| 5,533,111 A | 7/1996 | Schlanger | |
| 6,292,479 B1* | 9/2001 | Bartholomew et al. | 370/352 |
| 6,430,176 B1* | 8/2002 | Christie, IV | 370/355 |
| 6,614,902 B1* | 9/2003 | Rizzetto | 379/265.11 |

(Continued)

FOREIGN PATENT DOCUMENTS

EP        0 895 381 A    2/1999

(Continued)

OTHER PUBLICATIONS

International Search Report for PCT/GB01/04762 dated Aug. 19, 2002.

(Continued)

*Primary Examiner*—Steven H Nguyen
*Assistant Examiner*—Syed Bokhari
(74) *Attorney, Agent, or Firm*—Crowell & Moring LLP

(57) ABSTRACT

When voice over Internet Protocol (IP) capabilities are added to a conventional network of voice switches, an IP network is normally used to replace individual trunks between voice switches and to replace telephone lines between telephones and their serving voice switches. As a result, calls across the upgraded network often pass across a series of IP hops. Accordingly, the problem of replacing a series of IP hops by a single hop, to avoid degradation of end-to-end voice quality due to repeated packetization/depacketization sequences and associated functions such as compression/decompression, is addressed.

22 Claims, 2 Drawing Sheets

U.S. PATENT DOCUMENTS

| | | | |
|---|---|---|---|
| 6,697,776 B1 * | 2/2004 | Fayad et al. | 704/233 |
| 6,754,180 B1 * | 6/2004 | Christie | 370/236 |
| 6,765,903 B1 * | 7/2004 | Allen et al. | 370/356 |
| 6,781,983 B1 * | 8/2004 | Armistead | 370/353 |
| 6,831,898 B1 * | 12/2004 | Edsall et al. | 370/256 |
| 6,842,447 B1 * | 1/2005 | Cannon | 370/352 |
| 6,865,150 B1 * | 3/2005 | Perkins et al. | 370/230 |
| 6,987,757 B1 * | 1/2006 | Akiyama et al. | 370/353 |
| 7,002,919 B1 * | 2/2006 | El-Sayed | 370/252 |
| 7,016,351 B1 * | 3/2006 | Farinacci et al. | 370/392 |
| 7,239,629 B1 * | 7/2007 | Olshansky et al. | 370/353 |
| 7,254,832 B1 * | 8/2007 | Christie, IV | 726/11 |
| 2002/0181443 A1 * | 12/2002 | Coffey et al. | 370/352 |

FOREIGN PATENT DOCUMENTS

| | | | |
|---|---|---|---|
| EP | 0 996 273 A | | 4/2000 |
| EP | 1 069 742 | | 1/2001 |
| EP | 1 096 770 A2 | | 5/2001 |
| KR | 20010018574 | * | 5/2001 |
| KR | 200110018574 | * | 5/2001 |
| WO | WO97/23078 A | | 6/1997 |
| WO | WO 97/31492 | | 8/1997 |
| WO | WO0197460 | * | 12/2001 |

OTHER PUBLICATIONS

Search Report for GB0407848.1 dated May 7, 2004.

Hamdi, M., et al.: "Voice Service Interworking for PSTN and IP Networks," IEEE Communications Magazine, IEEE Service Center, Piscataway, N.J., US, vol. 37, No. 5, May 1999, pp. 104-111, XP000830888.

* cited by examiner

END-TO-END VOICE OVER IP STREAMS FOR TELEPHONE CALLS ESTABLISHED VIA LEGACY SWITCHING SYSTEMS

The present invention relates to the transmission of telephone calls over packet switching networks.

In a voice switching network based on ISDN technology, voice switches using circuit-switching techniques provide on-demand connections at a constant bit rate (typically 64 Kbit/s) between telephones. In the simplest case, a network comprises a single voice switch with a multiplicity of telephones, each connected to the voice switch by a physical circuit known as a telephone line. In the general case, a network comprises a multiplicity of voice switches, each with a multiplicity of telephone lines, the voice switches being interconnected by physical circuits known as trunks. Each pair of voice switches in the network can be directly connected by one or more trunks, thereby forming a full mesh topology. Alternatively, some pairs of voice switches need not be directly connected via trunks, provided they are indirectly connected via one or more other voice switches and two or more trunks.

Except where limited by policy considerations, any telephone in the network can establish a call to any other telephone in the same network, through a single switch (if the two telephone lines are served by the same voice switch), through two switches (if the two telephone lines are served by different voice switches that are directly interconnected by trunks) or through three or more voice switches (if the telephones lines are served by different voice switches that are not directly interconnected by trunks).

Current communications development is aiming towards a "one network for all" solution: by reaching a convergence of voice and data systems, there will no longer be a need to install separate networks in parallel for voice and data transmission. There is currently a strong drive to put voice traffic onto the data network. At the present time, the overall volume of data traffic is comparable to the amount of voice traffic. In the future, however, it is believed that the overall amount of data traffic will be far greater than the overall amount of voice traffic. The resulting common infrastructure can lead to potential cost savings and is exploitable by new voice-data applications.

Data networks operate on the principle of packet switching. The most widely accepted network layer protocol for data networks is the Internet Protocol (IP). Therefore networks employing IP (IP networks) are the current focus for the convergence of voice and data transmission. IP is used by the Internet itself and by numerous private and public Internet-like networks. IP operates between routers and host systems and governs the delivery of data packets. IP networks, and similar packet switched networks, differ from conventional telephone networks by delivering bursts of data (packets) rather than providing a circuit-switched pipe for a continuous stream of voice or data at a given bit rate (typically 64 Kbit/s).

Therefore the current trend in telecommunications is to use the infrastructure of an IP network to replace the separate infrastructure of the voice switching network. The IP network can be used instead of conventional trunks to provide connectivity between voice switches. It can also be used instead of conventional telephone lines to provide access to voice switches from telephones or other devices that incorporate the functionality of a telephone (e.g., personal computers), such devices being collectively called IP telephones. A consequence of this is that voice has to be transmitted through the IP network as packets of data instead of as a continuous bit stream.

Many existing networks operate with voice switches that function satisfactorily. Voice switches perform many functions in addition to the actual switching of voice paths. These additional functions include call establishment (including address resolution and routing), call clear-down, features such as call forwarding during call establishment and call transfer during established calls, call detail recording for billing purposes, and third party control of calls by special applications. Therefore voice switches are not directly replaceable by data routers. It is therefore preferred not to replace the voice switches, as this will require significant investment in new equipment to replace this functionality.

Voice switches can continue to directly support legacy telephones and trunks that are not supported by an IP infrastructure and/or which cannot directly interface with an IP infrastructure. These telephones and trunks, collectively referred to here as conventional telephones, can be involved in calls that extend over the IP network to another voice switch and/or that originate or terminate at an IP telephone.

Voice switches exchange signalling information (signalling messages) with other voice switches and telephones in order to accomplish the functionality described above.

The voice switches need to be equipped with gateways that convert between packetized voice, as transported over the IP network, and continuous bit stream voice, as switched by the voice switch. When the IP network is used to replace a conventional trunk, the gateway hides the IP network from the voice switch and appears to the voice switch as a conventional trunk. When the IP network is used to replace an extension line, the gateway hides the IP network from the voice switch and appears to the voice switch as a conventional extension line. In this way the voice switch does not require modification other than the addition of gateway equipment. A gateway can be physically separate from its voice switch or integrated into the same physical unit as its voice switch, but in either case it is logically separate from the voice switch.

An IP telephone also requires functionality to convert between packetized voice data, as transported by the IP network, and continuous bit stream voice data, required for interfacing with audio input/output equipment in the telephone. This functionality can be considered to be provided by a gateway, similar to the gateways described above as additions to voice switches. Thus a call between two IP telephones can be considered to pass through a gateway at the originating IP telephone, a pair of gateways at each of the voice switches along the path of the call, and a gateway at the terminating IP telephone. This is illustrated in FIG. 1 for a call between two IP telephones 10, 20 over an IP network 100. The call passes through three voice switches 30, 40, 50. In this example, the call passes through 8 gateways 61 to 68.

FIG. 2 extends FIG. 1 by showing a conventional telephone 70 served by voice switch 30 and a conventional telephone 80 served by voice switch 50. A call between conventional telephone 70 and conventional telephone 80 would pass through gateways 63-66. A call between IP telephone 10 and conventional telephone 80 would pass through gateways 61-66. A call between conventional telephone 70 and IP telephone 20 would pass through gateways 63-68.

The voice switches may be telephone exchanges, such as PABX, public or private exchanges.

These examples show that a call can have an integral number of IP segments, each segment having a gateway at each end, and therefore a call will pass through an even number of gateways. With respect to the direction of call establishment, the gateway upstream of an IP segment can be called an ingress gateway and the gateway downstream of an IP segment can be called an egress gateway. The first and last gateways along the path of a call (i.e., the first ingress gateway and the last egress gateway) can be called end gateways and any other gateways along the path of the call can be called intermediate gateways.

The IP network links between two voice switches may be over a corporate IP network, or a public IP network.

The IP network may also be used to replace individual extension lines to the desktop, or to the home, in a business or domestic environment.

An IP telephone 10, 20 has an IP gateway built in. It may look like an ordinary telephone, or it may be a computer such as a PC or workstation, provided with appropriate software, microphone and loudspeaker (or handset).

When voice over Internet Protocol (IP) capabilities are added to a conventional network of voice switches, an IP network is normally used to replace individual trunks between voice switches and to replace telephone lines between telephones and their serving voice switches. As a result, calls across such a network often pass via a series of IP hops. These hops may be between IP telephones 10, 20 and a voice switch 30, 40, 50, or between voice switches. At each hop, packetisation and depacketisation are carried out, so that a bit stream identical to the original bits stream (typically at 64 Kbit/s) may be provided into and be delivered by the receiving voice switch or IP telephone.

The gateways 62-67 themselves should be suitable for mounting onto existing voice switches, without modification to the voice switches themselves. These could be sold as plug-in modules. The voice switch 30, 20, 50 sees a conventional constant bit rate circuit (e.g., at 64 Kbit/s), which is converted from/to IP data packets by the IP gateways attached to each voice switch.

A gateway is responsible for transmitting and receiving signalling information and voice information respectively to and from the IP network. Packetization of voice information necessarily introduces a delay while sufficient bits are received to form a packet of convenient size. The shorter the packet, the shorter the delay, but very short packets can lead to excessive bandwidth use on the IP network owing to the need to include header information of fixed length in each packet. A typical packet of voice data will represent about 20 ms to 30 ms of speech, and will cause a corresponding delay. Introduction of such delay has an impact on voice quality as perceived by users engaged in a conversation. The more packetization steps, the greater the delay and the greater the impact on perceived voice quality. As a general guide, an arrangement that involves more than two packetization stages using reasonable packet sizes can be considered unacceptable. Furthermore, if voice compression is used to reduce bandwidth utilization in the IP network, each stage of packetization combined with compression introduces a measure of distortion, and it is desirable to keep this to a minimum.

In the interests of voice quality, it would be desirable to route voice packets directly between end gateways, by-passing any intermediate gateways.

The drawbacks above do not apply to signalling data, which can pass through intermediate gateways and through the associated voice switches without difficulty. This means that, as in current systems, the voice switches can participate in call establishment (including address resolution and routing) and offer a number of useful features that it would be useful to retain in any future system. Examples include call diverting, call forwarding, call transfer, links to computer based services, such as call centres. Furthermore, voice switches can be set up to enable or disable certain types of functionality. For example, international calls may be allowed, or barred, for certain users. Call detail recording for billing purposes and third party control of calls by special applications can be achieved. All of these functions are necessary even when an IP network is used to transfer the voice data. All these functions rely on signalling information passing through voice switches.

The present invention aims to alleviate the above mentioned drawbacks of using IP networks and gateways to replace conventional trunks and conventional extension lines in a voice switching network while retaining existing voice switches. In accordance with the present invention, and in the interests of voice quality, methods and apparatus are provided to route voice packets directly between end gateways, by-passing any intermediate gateways.

In essence, the present invention relates to packetised data signalling messages used to set up the circuit switching within exchanges (voice switches) to set up the links required, which are embodied as circuit-switching type bit streams within the voice switches, but are converted to/from data packets which are sent between voice switches and telephones over an IP-type network. The invention also relates to a voice data stream, which is preferably transmitted directly between end gateways, but may be routed via the voice switches.

The present invention addresses the problem of replacing a series of IP hops by a single hop for the purpose of voice transmission, to avoid degradation of end-to-end voice quality due to repeated packetization/depacketization sequences and associated functions such as compression/decompression.

The present invention achieves its advantages by providing a single IP hop for voice data, but routes control signals through multiple hops via voice switches, to make use of the range of functions offered by the voice switches. The voice data will then not travel on the existing voice network, but rather, the voice data will travel on the data network and will not pass through intermediate voice switches.

The present invention therefore provides a method of signalling to indicate an end ingress gateway in a telephone network comprising a number of voice switches each linked to a packet switched data communications network by respective gateways. The method comprises, in a packet network ingress gateway, the steps of: (1) receiving a forward signalling message to be transmitted; (2) examining the packet for an end ingress gateway indication; (3) in response to no such indication being found, inserting such an indication; (4) alternatively to (3), in response to finding such an indication, retaining that indication; (5) transmitting the resulting signalling message towards a call destination.

In certain embodiments of the invention, the method comprises the steps of generating a forward signalling message in an ingress gateway; and transmitting the forward signalling message via at least one further gateway. Each ingress gateway then performs the steps described above. In such embodiments, the gateway which inserts the indication into the forward signalling message may identify itself as the end ingress gateway.

The present invention also provides a method of signalling to indicate an end egress gateway in a telephone network comprising a number of voice switches linked to a packet switched data communications network by respective gateways. The method comprises, in a packet network egress gateway, the steps of: (1) receiving a backward signalling message to be transmitted; (2) examining the packet for an end egress gateway indication; (3) in response to no such indication being found, inserting such an indication; (4) alternatively to (3), in response to finding an indication, retaining that indication; and (5) transmitting the resultant signalling message towards a call origin.

Certain embodiments of this method, comprise the steps of generating a reverse signalling message in an end egress gateway; and transmitting the reverse signalling message via at least one further egress gateway. Each egress gateway performs the steps described above. In such embodiments, the gateway which inserts the symbol into the reverse signalling message may identify itself as the end egress gateway.

In any of the methods of the present invention, each inserted indication may represent a network address of the gateway which inserts it. In this case, the end egress gateway may examine the indication received from the end ingress gateway to derive the network address of the end ingress gateway; and end ingress and egress gateways may establish direct communication between themselves over the packet switching network for signalling. In such methods, the end ingress gateway may examine the indication received from the end egress gateway to derive the network address of the end egress gateway. End ingress and egress gateways may establish direct communication between themselves over the packet switching network for signalling.

The signalling may serve the purpose of exchanging parameters for establishing direct communication of voice data packets.

Signalling data may be communicated between the end ingress and egress gateways through voice switches linked to the packet switching network by intermediate ingress and egress gateways.

The indications may be inserted into the forward and/or reverse signalling message(s) by use of a tunnelling mechanism provided in a signalling protocol used by the voice switches. The signalling messages may then be received, examined and modified if appropriate, by a gateway which then converts the packet data into a bitstream of data for supply to an associated voice switch. The associated voice switch may then perform any required switching or other functions on the bitstream, without examining the tunnelled symbol, and supplies the bitstream of data to a further associated gateway. The further associated gateway may then convert the bitstream back into packet data, examine the packet data and modify it if appropriate, before transmitting the packet data on the packet switching network to a next gateway.

In any of the methods of the present invention, the end ingress and egress gateways may exchange data between themselves to govern the setting of certain operation parameters, by including suitable data in tunnelled data sent with the forward and reverse signalling messages. Further signalling messages may be exchanged by end ingress and egress gateways to carry further tunnelled data. Said parameters by be omitted from signalling messages transmitted via the voice switches.

The present invention also provides a method of transmitting telephone conversations over a telephone system comprising a number of voice switches each connected to a packet switched data communications network by respective gateways. The method comprises the steps of: establishing a first call path for voice data and control data over packet switching links, through gateways and voice switches, between a calling party and a called party; establishing a second call path directly over the packet switching network between an end ingress gateway, being the gateway first encountered on the call path emanating from the calling party, and an end egress gateway, being the final gateway encountered on the call path before reaching the called party; transmitting voice data over the second call path from the end ingress gateway to the end egress gateway; and transmitting control data over the first data path.

The first call path is preferably maintained ready to transmit voice data in the event that the second call path is not available, or is not desired.

Once the second call path is established, the end gateways may send silence suppression commands to other gateways on the first call path, and may cease the transmission of voice data on the first call path. The other gateways may feed continuous bitstreams representing silence through their respective associated voice switches.

The above, and further objects, characteristics and advantages of the present invention will become more apparent with reference to the following description of certain embodiments of the present invention, given by way of examples only, in conjunction with the appended drawings, in which.

The invention relates to the convergence of voice and data networks: both networks currently exist. In the methods and apparatus of the present invention, the control operations remain in the existing voice switches, which will remain in use.

The invention therefore follows an evolutionary approach to network development, retaining the most useful features of the existing networks. The alternative, that is to dispose of all existing equipment and build a new network from scratch, would be too costly and too risk-intensive for most network operators to contemplate.

Figure 1:
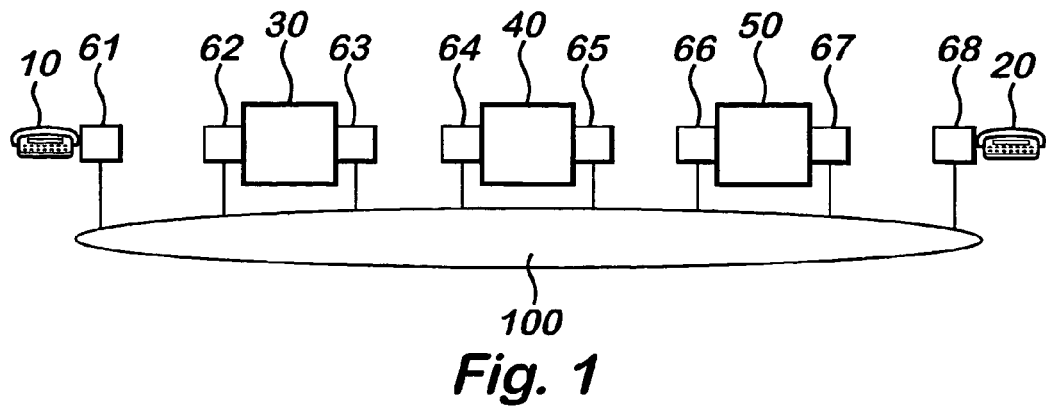
FIG. 1 illustrates a conventional telephone system using IP network communication between telephones and voice switches.
Figure 2:
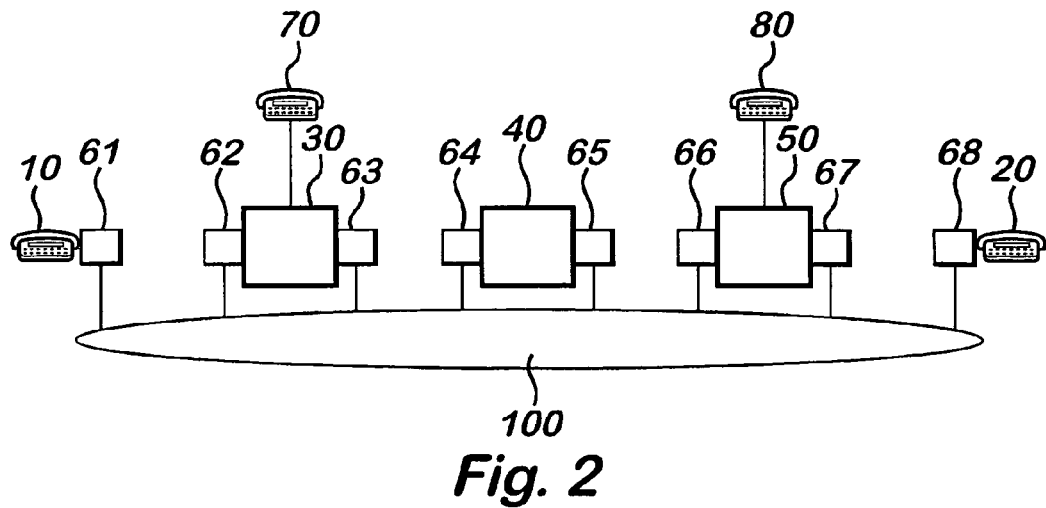
FIG. 2 illustrates a conventional telephone system similar to that shown in FIG. 1, with the addition of conventional telephones linked to the voice switches.
Figure 3:
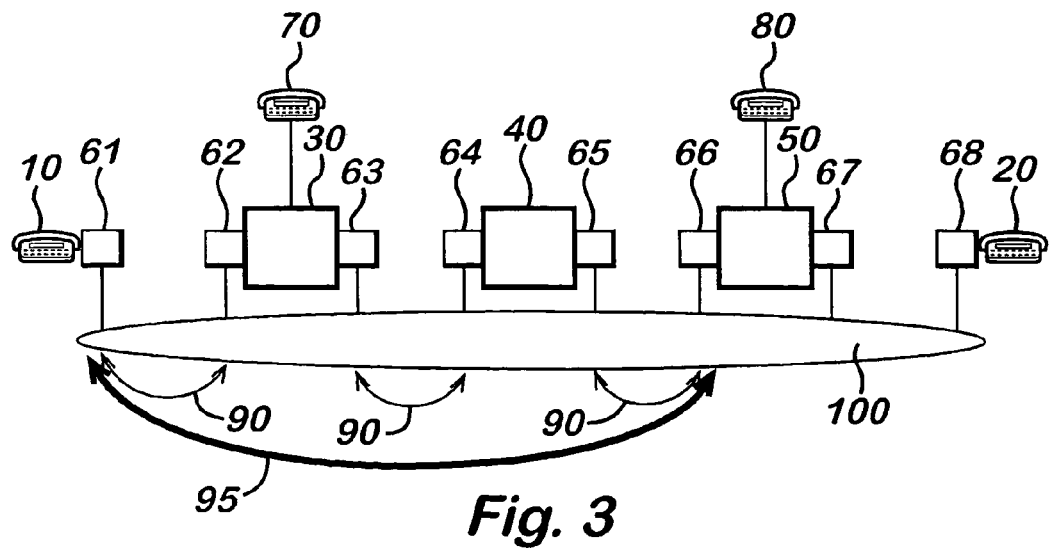
FIG. 3 illustrates a telephone system according to an embodiment of the present invention.

FIG. 3 illustrates a call between IP telephone 10 and conventional telephone 80 (in accordance with the numbering of the arrangement in FIG. 2). Although signalling 90 passes through gateways 61-66, voice data 95 passes directly between gateway 61 and gateway 66.

To establish packetized voice transmission across the IP network between two gateways, signalling is required between those two gateways for purposes such as: exchanging IP addresses and UDP port numbers; agreeing on the voice encoding standard to be used (e.g., uncompressed, various types of compression); and agreeing on other attributes, such as the use of silence suppression techniques to avoid wasting bandwidth in the IP network during periods of silence. This is in addition to the signalling that voice switches are concerned with.

A first group of embodiments of the present invention provides a method for identifying the end gateways.

Each end gateway needs an IP address to enable it to transmit and receive data over the IP network. In practice, every gateway will have an IP address, although one object of the invention is to ensure that only the end gateways are involved in IP voice data transfer. If packetized voice is to be transported directly between end gateways, the end gateways first need to know that they are indeed the end gateways for the call concerned. The end gateways may then engage in inter-gateway signalling for the purpose of establishing packetized voice data transmission directly between themselves. The intermediate gateways need to know that they are not end gateways for the call concerned, and that they are not required to engage in this signalling.

The gateways in IP telephones will always be end gateways since a call involving an IP telephone will always, necessarily, begin or end at that telephone. Gateways attached to voice switches can be either end gateways or intermediate gateways. A gateway at a voice switch will be an end gateway when a call is connected to a conventional telephone at the local voice switch (e.g. telephone 80 of FIG. 3). Since the gateways are added to voice switches without change to the voice switches, a means is required whereby gateways can discover, without assistance from voice switches, whether or not they are end gateways.

According to this first aspect of the invention, a tunnelling capability is used. A tunnelling capability exists in most signalling protocols that are available for use between voice switches or between a voice switch and a telephone. A tunnelling mechanism allows information to be signalled by encapsulating data within an 'envelope' which is passed through voice switches and delivered without change. The voice switches recognise that an envelope is being sent, but do not look at the contents. Tunnelling mechanisms that are common to two or more different signalling protocols have the additional advantage that information can be tunnelled through different signalling protocols in series, without the voice switch at the boundary between the two signalling protocols needing to understand and act on the contents of the envelope.

One example of a tunnelling mechanism is an extension of a signalling protocol to include manufacturer-specific or network-specific additions that are not part of the protocol standard. Another example is the user-to-user signalling capability that exists in protocols such as DSS1 and SS7.

By choosing a tunnelling mechanism that exists in the signalling protocol or protocols used in a voice network, information relevant to gateways can be tunnelled through voice switches.

Figure 4:
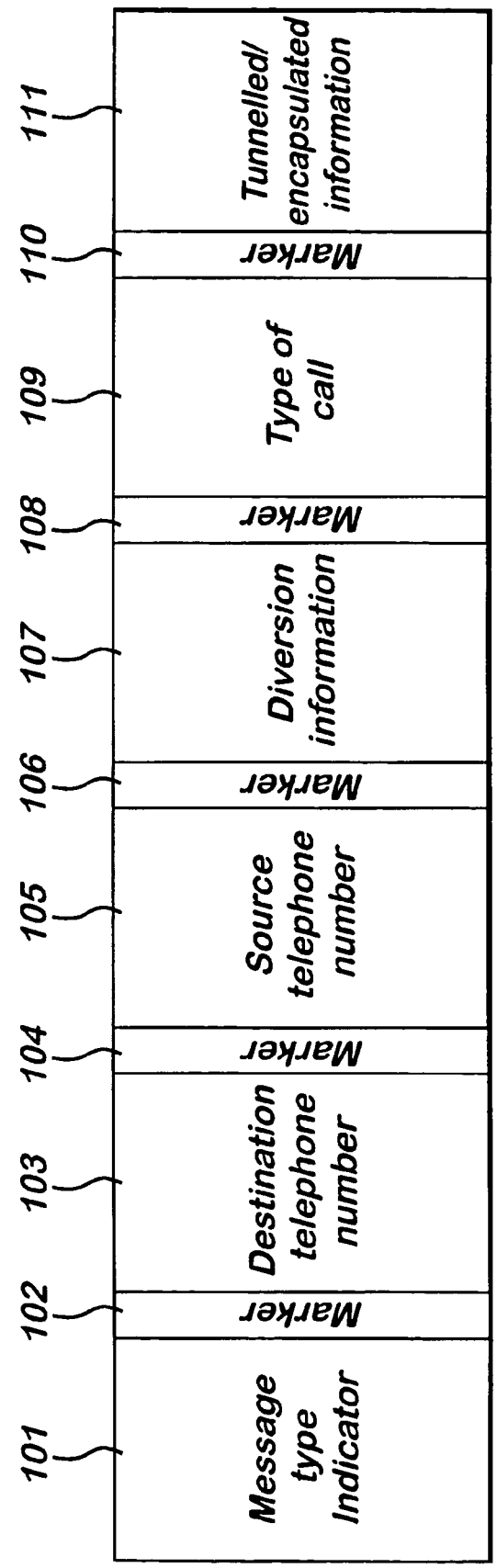
FIG. 4 shows a typical format of a signalling message between two voice switches or between a telephone and a voice switch according to a feature of certain embodiments of the invention.

The structure of a typical signalling message for a call establishment request, according to certain embodiments of the invention, is shown in FIG. 4. Tunnelled data is defined in the signalling protocol, which will require any switch that does not recognise the tunnelled information to pass it on the next switch, unaltered.

As shown in FIG. 4, a call establishment request signalling message according to certain embodiments of the present invention, may comprise the following elements, in order:

| | |
|---|---|
| 101 | message type indicator |
| 102 | marker for destination telephone number |
| 103 | destination telephone number |
| 104 | marker for source telephone number |
| 105 | source telephone number |
| 106 | marker for diversion information |
| 107 | diversion information |
| 108 | marker for type of call |
| 109 | type of call |
| 110 | marker for tunnelled/encapsulated information |
| 111 | tunnelled/encapsulated information |

The format of the marker for tunnelled/encapsulated information should be standardised to operate with voice switches from different manufacturers.

According to certain embodiments of the invention, when establishing a call, for example from telephone 10 to telephone 80, a typical signalling protocol uses an initial call establishment request message in the forward direction (from the originating telephone 10 towards the destination telephone 80), which is routed by each voice switch 30, 40, 50 until it arrives at the destination telephone 80. This also establishes a path along which further signalling on behalf of that call can take place. Each voice switch takes the destination number and works out the route required for the next hop, i.e. a trunk or an extension line. If it is an IP trunk, the ingress gateway will derive the IP address of the egress gateway of that IP hop. When the destination telephone has been reached, an end-to-end message in the backward direction is sent to indicate the status of the telephone (e.g., alerting the user). These first or subsequent end-to-end messages in each direction can be used to carry tunnelled information between gateways to enable each gateway to determine its function, that is, whether it is an end gateway such as 61, 66 in this example, or an intermediate gateway, any of 62-65.

When an ingress gateway (e.g. 61,63,65) receives the first forward signalling message of a call, it examines the message to see whether it contains tunnelled indication that some other gateway (e.g. 61) is the first ingress gateway. If so, (e.g. 63,65) it behaves as an intermediate gateway for the call. If not, (e.g. 61) it behaves as an end gateway for the call and inserts an indication that the call has already passed through an ingress gateway, into the signalling message before transmission to the next gateway, thus ensuring that subsequent ingress gateways 63,65 act as intermediate gateways.

According to certain embodiments of the present invention, when an egress gateway (62,64,66) receives the first backward signalling message of a call, it examines the message to see whether it contains a tunnelled indication that some other gateway (66) is the first egress gateway. If so, it (62,64) behaves as an intermediate gateway for the call. If not (66), it behaves as an end gateway for the call and inserts an indication that the call has already passed through an egress gateway into the signalling message before transmission to the next gateway, thus ensuring that subsequent egress gateways (64,62) act as intermediate gateways.

Thus each gateway discovers whether it is an end gateway or an intermediate gateway.

A second group of embodiments of the present invention relates to a means for transporting the signalling information needed to establish packetized voice transport between the two end gateways. This second aspect of the invention is preferably used in conjunction with the first aspect. Since gateways are added to voice switches without change to the voice switches, the requirement for signalling information to be passed between end gateways must be met by the gateways without assistance from the voice switches.

IP is a network layer protocol. The next higher protocol layer is the transport layer, which gets information end-to-end between the endpoints (gateways). The IP is examined by routers, while the transport protocol is not. The simplest transport protocol is UDP (User Datagram Protocol), which is used for transmitting voice data. The particular value added by this transport protocol is that it also contains source and destination port addresses.

Each gateway has one IP address, but may have many port numbers. Voice data from a transmitting gateway to a receiving gateway for a given call is distinguished from voice data relating to other calls by having a unique port address at the transmitting gateway and a unique port address at the receiving gateway. The UDP header for each data packet will contain the source and destination port addresses.

Before a source gateway can transmit UDP packets carrying voice data for a particular call to the destination gateway, it needs to know the IP address of the destination gateway, the UDP port number assigned by the destination gateway for that particular call, the type of voice encoding to be used (e.g., uncompressed, various types of compression) and other attributes (e.g., whether to use silence suppression). This amount of information may well exceed the maximum data carrying capability of the tunnelled information slot in each signalling message or may cause the total length of the signalling message to exceed the maximum allowed for the signalling protocol concerned. The data transfer may be slowed by many hops between switches etc. Segmenting the tunnelled information so that it is carried in more than one signalling message may solve the capacity problem but will slow down proceedings further.

According to this second group of embodiments of the present invention, only the IP address of the first ingress gateway (61) is tunnelled along with the end gateway indication in the first forward signalling message. Each egress gateway (62, 64, 66) receiving the end gateway indication and IP address in the first forward message saves the IP address in its local memory. If any egress gateway discovers that it is an intermediate gateway it discards the saved IP address. If any egress gateway discovers that it is the last egress gateway (66) (i.e., an end gateway) it uses the saved IP address of the first ingress gateway to establish direct communication 95 via the IP network with the first ingress gateway (i.e., the peer end gateway) (61). This direct communication 95 between the peer end gateways 61, 66 can then be used to exchange all other information needed for establishing packetized voice transmission.

The first reverse signalling message may contain the IP address of the last egress gateway, although this is not essential to allow direct communication to take place, as the last egress gateway can directly address the first ingress gateway once the first forward signalling message has been received.

A third group of embodiments of the present invention concerns the means of switching to and from packetized voice transmission directly between end gateways. Such transmission cannot be accomplished until call establishment has reached a certain stage. Firstly, the call is built up step by step through a series of voice switches 30, 40, 50 similarly to a conventional circuit switching system. Any one of these switches can transmit in-band (audible) information back towards the caller 10. In particular, the final switch 50 generally transmits ringing tone back towards the caller 10 during the alerting phase. Furthermore, the identity of the destination telephone 80 can change during the alerting phase owing to features such as forwarding on no reply. For this reason it is desirable to have packetized voice transmission in place between the calling IP telephone 10 and the first voice switch 30 and between each voice switch 30, 40, 50 (link-by-link packetized voice transmission 90) as early as possible during call establishment and to replace this with end-to-end packetized voice transmission 95 only after the call has been answered. The additional delays and distortions of link-by-link packetized voice transmission 90 can generally be tolerated during the time before answer.

During the course of a call there may be a need to revert to link-by-link packetized voice transmission 90. A typical case is where one of the parties places the call on hold using the capabilities of its serving voice switch. That voice switch may transmit an in-band indication (e.g., music) towards the other (held) party. In this case, the additional delays and distortions of link-by-link packetized voice transmission can generally be tolerated. Another case is where three or more parties are to be connected together by means of a conference bridge at one of the voice switches, or it may be necessary to switch between end points, for example in the case of call transfers, group pickup, enquiry calls. In this case, link-by-link packetized voice transmission 90 should be seen as an interim step, to be replaced as soon as practical by end-to-end packetized voice transmission 95 between the voice switch containing the conference bridge and the gateway nearest to each of the parties.

Switching back to link-by-link packetized voice transmission 90 will involve a period of signalling to establish packetized voice transmission on each of the links 90 concerned. This can lead to a noticeable delay before voice transmission is re-established, leading to the loss of the start of the new conversation or recorded announcement. Alternatively, link-by-link packetized voice transmission 90 could be retained in parallel with end-to-end packetized voice transmission 95, but this would use additional bandwidth in the IP network.

According to this third aspect of the present invention, a silence suppression capability commonly used with voice over IP implementations is employed to maintain link-by-link packetised voice transmission in parallel with end-to-end packetised voice transmission without requiring significant extra bandwidth in the IP network. A silence suppression method involves the use of a means for detecting the presence or absence of voice activity, coupled with a means for replacing regular voice packet transmissions with a smaller amount of transmitted information during periods of no detected voice activity. For example, at the start of a detected period of no voice activity, a single data packet can be transmitted to indicate that there is no voice activity and to provide a voice pattern that can be replayed repeatedly at the receiving gateway to represent background noise as reassurance to the listening party. This removes the need for further packets to be transmitted until a resumption of voice activity is detected. This enables a considerable reduction in bandwidth occupied in the IP network by the call.

If silence suppression is used, link-by-link packetized voice transmission 90 can be retained even when there exists end-to-end packetized voice transmission 95 in parallel, due to the considerable reduction in bandwidth associated with a silence suppressed call. Each end gateway 61, 66 transmits packetized voice data directly to the peer end gateway 66, 61 and also transmits information denoting no voice activity to the nearest intermediate gateway 62, 65. The nearest intermediate gateway generates a continuous bit stream representing silence for transmission through the its local voice switch, and the intermediate gateway 63, 64 on the other side of that voice switch detects no voice activity and transmits silence suppression information denoting no voice activity to the next gateway. This process is repeated until the peer end gateway is reached, where incoming voice packets from its nearest intermediate gateway are ignored in favour of voice packets received directly from the other end gateway. In this way, negligible bandwidth in the IP network is occupied by the retained, silence suppressed, link-by-link packetized voice transmission. As soon as there is a need to revert to link-by-link packetized voice transmission 90, each end gateway merely has to resume the transmission of normal voice packets, instead of silence suppression signals. The intermediate voice switches and their gateways will be immediately capable of carrying the conversation, as the voice data links have been maintained in an active state.

The use of silence suppression is agreed between two gateways by signalling, for example by using the methods according to the second group of embodiments of this invention, at the same time as agreeing other parameters such as the type of voice coder/decoder to be used. Normally the use of silence suppression leads to a small impairment of voice quality, and therefore the policy in some networks will be not to use silence suppression under normal circumstances. Where silence suppression is not normally used, it can still be invoked for link-by-link packetized voice transmission that is being retained in parallel with end-to-end packetized voice. A single signalling message along the path 90, of the call is sufficient to turn silence suppression on or off for this purpose. This is quicker than the signalling needed to re-establish packetized voice across each link if link-by-link packetized voice transmission were to be cleared down during periods of end-to-end packetized voice. Furthermore, any delay in turning silence suppression off when end-to-end packetized voice ceases will not matter, since voice transmission will resume automatically as soon as the end of silence is detected.

While switching between direct packetized voice transmission 95 and link-by-link packetized voice transmission, it may be found necessary to provide some overlap, to prevent a gap in the call. That is, it may be necessary to transmit voice data in parallel on both routes for a time, while routing/switching takes place. In such circumstances some intelligence is required on the part of the gateway, to ensure that speech is sent on both routes while switching takes place.

In practice, the inventors have found it not necessary to provide an overlap, but this will depend on signalling speeds achievable.

The invention claimed is:

1. A method of transmitting telephone conversations over a telephone system comprising a number of voice circuit switches each connected to a packet-switched data communications network by respective gateways, said method comprising the steps of:
    establishing a first call path for voice data and control data between a calling party and a called party through an end ingress gateway to the packet-switched network, an end egress gateway from the packet switched network and at least one intermediate voice circuit switch with an egress gateway from the packet-switched network and an ingress gateway to the packet-switched network, the first call path comprising a concatenation of packet-switched and circuit-switched segments;
    establishing a second call path for voice data and control data directly over the packet-switched network between the end ingress gateway, being the gateway first encountered on the call path emanating from the calling party, and the end egress gateway, being the final gateway encountered on the call path before reaching the called party, wherein the second call path bypasses the intermediate voice circuit switch and the intermediate voice circuit switches ingress and egress gateways;
    after establishing the first call path, transmitting voice data over the first call path;
    after establishing the second call path and after the called party has answered, transmitting voice data over the second call path directly between the end ingress gateway and the end egress gateway instead of via the first call path;
    maintaining the first call path for mid-call and end-of-call signaling that involves the intermediate voice circuit switch and for mid-call voice data; and
    continuing to transmit voice data over the first call path in the event that the second call path is not available.

2. The method of claim 1 further comprising the steps of:
    receiving, by a packet network ingress gateway, a forward signalling message packet to be transmitted;
    examining, by the packet network ingress gateway, the packet for an end ingress gateway indication;
    when the packet does not include an end ingress gateway indication, the packet network ingress gateway inserts an end ingress gateway indication into the packet, wherein the inserted indication represents a network address of the gateway which inserts it;
    when the packet includes the end ingress getaway indication, the packet network ingress gateway retains the indication;
    transmitting, by the packet network ingress gateway, the resulting signalling message packet towards the called party.

3. A method according to claim 2, comprising the steps of generating the forward signalling message packet in the end ingress gateway; and transmitting the forward signalling message packet via at least one further gateway.

4. A method according to claim 3, wherein the gateway which inserts the indication into the forward signalling message packet identifies itself as the end ingress gateway.

5. The method of claim 1 further comprising the steps of:
    receiving, by a packet network egress gateway, a backward signalling message packet to be transmitted;
    examining, by the packet network egress gateway, the packet for an end egress gateway indication;
    when the packet does not include an end egress gateway indication, the packet network egress gateway inserts an end egress gateway indication into the packet, wherein the inserted indication represents a network address of the gateway which inserts it;
    when the packet includes the end egress gateway indication, the packet network egress gateway retains the end egress gateway indication; and
    transmitting, by the packet network egress gateway, the resultant signalling message towards the calling party.

6. A method according to claim 5, comprising the steps of generating a reverse signalling message in the end egress gateway; and transmitting the reverse signalling message via at least one further egress gateway.

7. A method according to claim 6, wherein the gateway which inserts the end egress gateway indication into the reverse signalling message identifies itself as the end egress gateway.

8. A method according to claim 4, wherein:
    an end egress gateway examines the indication received from the end ingress gateway to derive the network address of the end ingress gateway; and
    the end ingress and egress gateways establish direct communication between themselves over the packet-switched network for signalling.

9. A method according to claim 7, wherein:
    the end egress gateway examines the indication received from an end ingress gateway to derive the network address of the end ingress gateway; and
    the end ingress and egress gateways establish direct communication between themselves over the packet-switched network for signalling;
    the end ingress gateway examines the indication received from the end egress gateway to derive the network address of the end egress gateway; and
    the end ingress and egress gateways establish direct communication between themselves over the packet-switched network for signalling.

10. A method according to claim 8, wherein the signalling involves exchanging parameters for establishing direct communication of voice data packets.

11. A method according to claim 8, wherein signalling data is communicated between the end ingress gateway and the end egress gateway through the voice switches linked to the packet-switched network by intermediate ingress and egress gateways.

12. A method according to claim 2, wherein the indications are inserted into the forward signalling message or reverse signalling message using a tunnelling mechanism provided in a signalling protocol used by the voice switches.

13. A method according to claim 12, wherein the signalling messages are received, examined and modified if appropriate, by a gateway which then converts the packet data into a bitstream of data that is supplied to an associated voice switch, the associated voice switch performs any required switching or other functions on the bitstream, without examining the tunnelled symbol, and supplies the bitstream of data to a further associated gateway, the further associated gateway converts the bitstream back into packet data, examines the packet data and modifies it if appropriate, before transmitting the packet data on the packet-switched network to a next gateway.

14. A method according to claim 2, in which the end ingress gateway and an end egress gateway exchange data between themselves to govern the setting of certain operation parameters, by including suitable data in tunnelled data sent with the forward and reverse signalling messages.

15. A method according to claim 14 wherein further signalling messages are exchanged by the end ingress and egress gateways to carry further tunnelled data.

16. A method according to claim 15 wherein said parameters are not included in the signalling messages transmitted via the voice switches.

17. A method according to claim 1, wherein, when the second call path is established, the end gateways send silence suppression commands to other gateways on the first call path, and cease the transmission of voice data on the first call path.

18. A method according to claim 17 wherein the other gateways feed continuous bitstreams representing silence through their respective associated voice switches.

19. The method of claim 1, wherein the mid-call signaling is associated with a call transfer.

20. The method of claim 1, wherein the end-of-call signaling is associated with call detail recording.

21. The method of claim 1, wherein the mid-call voice data is associated with music.

22. The method of claim 1, wherein signaling on the first call path allows the end egress gateway to discover an address of the end ingress gateway and the end ingress gateway to discover an address of the end egress gateway in order to facilitate establishment of the second call path.

* * * * *